Donald W. Sherman
INVENTOR.

BY *Elvin A. Andrus*
ATTORNEY.

April 9, 1940.   D. W. SHERMAN   2,196,537
PRESSED STEEL FIFTH WHEEL
Filed Sept. 3, 1937   2 Sheets-Sheet 2

Donald W. Sherman
INVENTOR.

BY *Elwin C. Andrus*
ATTORNEY.

Patented Apr. 9, 1940

2,196,537

UNITED STATES PATENT OFFICE 2,196,537

PRESSED STEEL FIFTH WHEEL

Donald W. Sherman, Shorewood, Wis., assignor to A. O. Smith Corporation, Milwaukee, Wis., a corporation of New York Application September 3, 1937, Serial No. 162,260

10 Claims. (Cl. 280—33.1)

This invention relates to a fifth wheel, such as is used to connect an automobile tractor and a trailer. The general principle of fifth wheel construction is oil in the art of wagons and tractor-trailer combinations. It consists primarily in providing two flat horizontal surfaces which act as bearings to permit rotation of the rearward unit about the center of the linking member and support the weight of such unit over as broad an area as possible.

One of the most common assemblies now employed provides for a circular cross member extending across the tractor and capable of sliding fore and aft between springs in brackets rigidly attached to the tractor. The fifth wheel is attached to the cross member by bearings on each side of the center line to permit tilting of the wheel. Normally the downward load is transmitted directly from the trailer plate to the outer ring of the fifth wheel and directly into the bearings and cross shaft.

In the event of an upward load at the king pin, such as frequently occurs during side-sway and also when the tractor tends to drop away from the trailer, the upward pull of the king pin upon the fifth wheel must be transferred outwardly to the outer bearings. This strain, which is very severe, has necessitated the use of a particularly heavy cast construction for the fifth wheel through the section between the bearings and has discouraged the use of pressed steel which has the advantages of lighter weight and more economical fabrication.

It is the object of the present invention to provide a pressed steel fifth wheel which will withstand all the stresses occurring under present types of operations and still be capable of relative movement and provide the cushioning means and other desirable features used in present, and heavier type constructions. A further object is to provide a three point support between the fifth wheel and cross member, thus insuring more even distribution of the load.

Another object of this invention is to provide a central link between the fifth wheel and cross member capable of permitting pivoting, thrust in the fore and aft direction and side-sway, thus rendering it unnecessary to attach the fifth wheel at its outer circumference to the cross member in order to prevent the wheel from being lifted from the truck and permitting the use of lighter material through the sections between the bearings.

A still further object is to maintain supports for the outer section of the wheel upon which the weight of the trailer must be carried, which will be capable of pivoting upon the cross member.

These and other objects of the invention are illustrated in the drawings and description. Referring to the drawings.

The upper surface of the fifth wheel consists of a plate 1 which is circular in shape and provided with rearward extensions 2, forming an inclined plane upon which the trailer slides while being picked up by the tractor. Normally the fifth wheel is so weighted that it will tilt downward toward the rear to facilitate coupling. A slot is provided between the extensions 2 with the conventional V-shaped opening so that the trailer pin may be guided crosswise into the locking mechanism when the tractor is not centered exactly with respect to the trailer.

Figure 1:
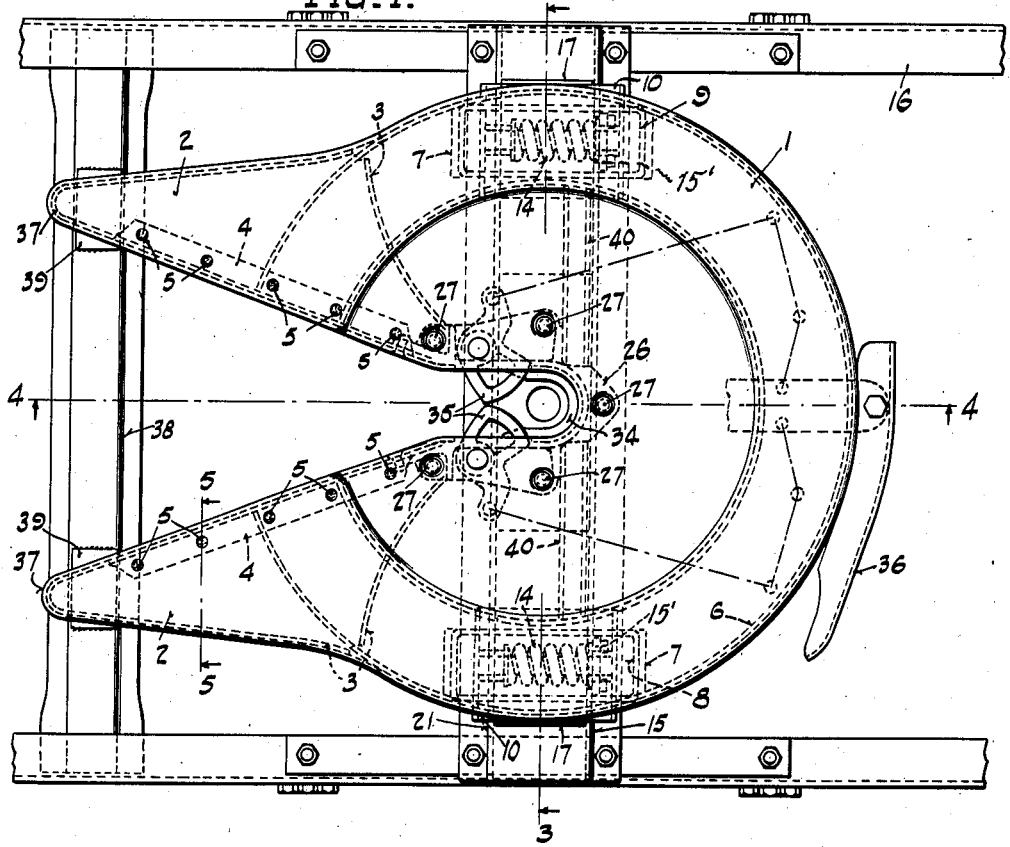
Figure 1 is a top view of the fifth wheel.
Figure 5:
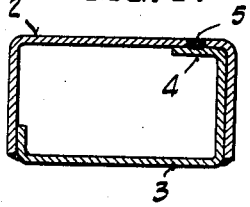
Fig. 5 is a cross sectional view taken along line 5—5 of Fig. 1.
Figure 6:
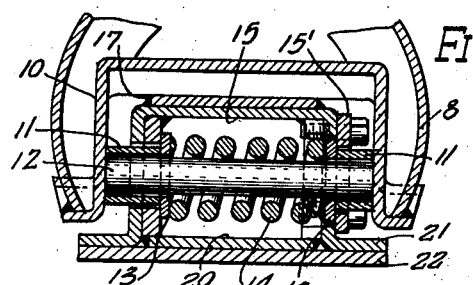
Fig. 6 is an enlarged view of the bearing section shown in Fig. 2.

The extensions 2 are made of strong sheet metal channel construction and are reinforced at the inner extremities by a complementary channel section 3, which has a flange 4 beneath the surface of the inclined extension and is welded to it at a number of spots 5 as shown in Figures 1 and 5.

Figure 2:
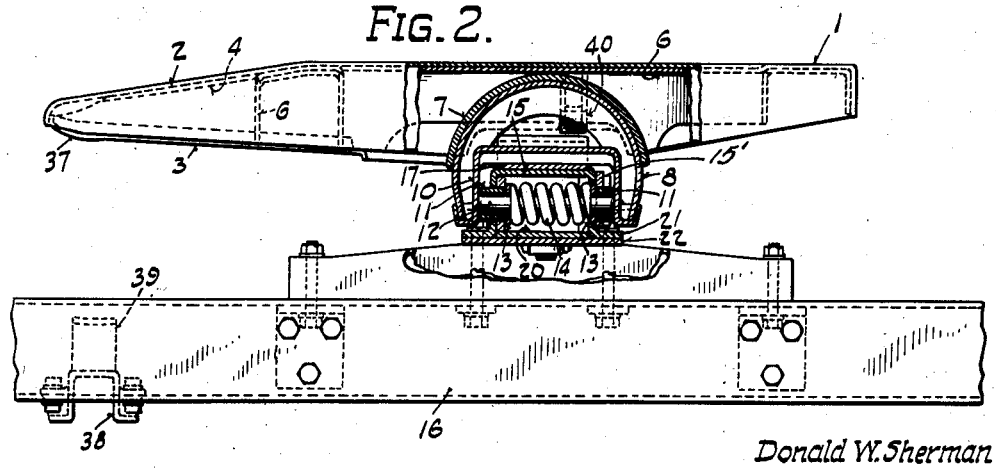
Fig. 2 is a side view of the device shown in Fig. 1, partly in section.

The plate 2 is slightly raised around its outer periphery in order that the load may be localized over this surface and transferred to the circularly shaped channel members 6 and the plate 7 which are welded to it and support it from beneath. The plate 7 is a semi-circular cross section as shown in Fig. 2 and rests upon channel member 8, which follows the contour of the plate 7 and acts as a bearing for the fifth wheel permitting it to tilt. Channel member 9 is an exact duplication of channel member 8 and is located on the opposite side of the fifth wheel to provide the second point of support and bearing.

Hereafter only one side of the structure will be described, it being understood that a corresponding structure will be employed to support the other side.

Bearing member 8 is welded to a short channel member 10. Sleeves 11 are mounted on opposite ends of a shaft 12 confined between the side webs of the cross member 10. Washers 13 normally engage the inner ends of the sleeves 11 and are held thereto by compression spring 14 interposed between the washers. The sleeves 11, shaft 12, washers 13 and spring 14 constitute a cushioning unit and are supported by a cross member 15 secured to the frame or body 16 of the tractor. The spring 14 is retained by a plate 15' bolted to the vertical flange of the cross member 15. This arrangement facilitates assembly and provides the desired cushioning. The members 10 supporting the bearings 8 and 9 straddle the cross member 15 and are normally held central thereto by the cushioning units.

It is readily seen that the structure just described permits relative movement fore and aft between the fifth wheel and its support on the frame, thus providing a cushion against sudden jerks as are experienced when coupling or under unsual road conditions. The spring device shown is old in the art and no claim of novelty is made regarding it.

The heavy plate 17 and the vertical webs 18 and 19 of the U-shaped member 20 are for reenforcing purposes to support the downward thrust of the trailer load.

Figure 3:
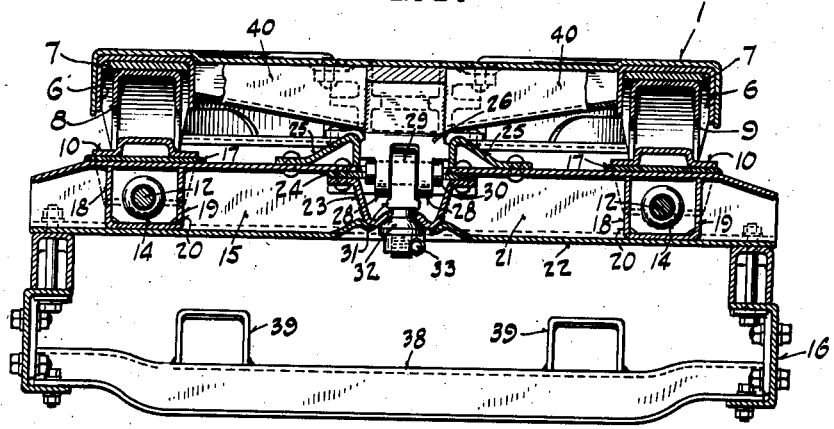
Fig. 3 is a sectional view of the structure taken along the line 3—3 of Fig. 1.
Figure 4:
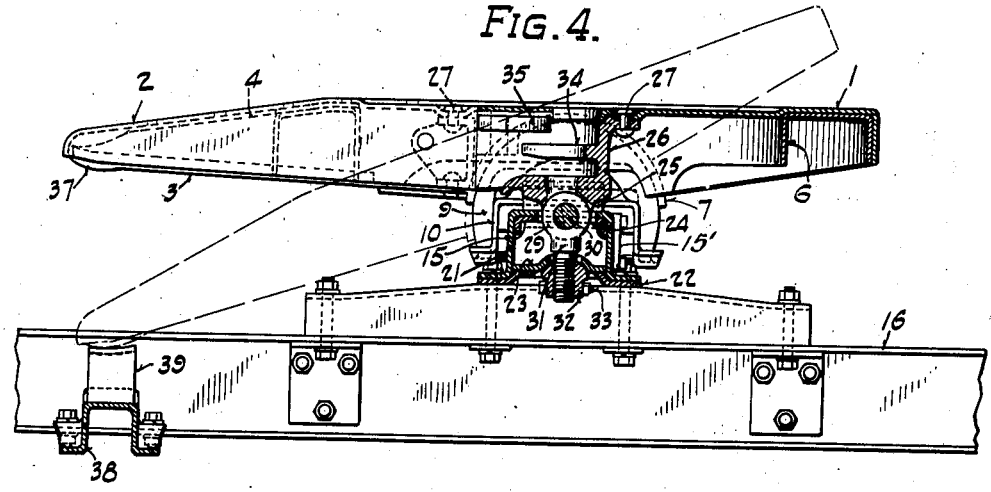
Fig. 4 is a sectional view of the structure taken along the line 4—4 of Fig. 1.

The cross member 15 is of box construction and is preferably made of an inverted U channel section 21 reinforced by a base plate 22 as shown in Figures 3 and 4. Bracket 23, riveted to channel 21, through reinforcing plate 24 is welded to the base 22, and forms a bearing for the center link. Brackets 25 act as stiffeners to resist side thrusts.

As it is commonly used, the king pin, which is attached to the trailer, has a reduced diameter near its lower end to permit a locking member to hold it in engagement with the fifth wheel. A casting 26 with a central opening for the trailer pin is located beneath the plate 1 and riveted to the plate at a number of points 27. The plate is slightly dished at these points to protect the heads of the rivets and prevent their protrusion above the plate surface.

From the base of the casting extends a pair of spaced ears 28 which cooperate with an eye bolt 29 and a pin 30 to create a hinge for rotation complementary to the rotation of the wheel about the two bearings at its outer extremeties. The shaft of the eye bolt 29 is journalled in the bracket 23 by a ball and socket joint, there being an enlarged shank 31 to protect the journal against downward thrust. A spherical headed nut 32 is threaded onto the lower end of the shaft and clamped by bolt 33.

The opening in the cross member through which the shaft extends is slightly larger than the shaft in order that the shaft may tilt in the bearing toward the front or rear or to either side. Such movement is necessary to compensate for the cushioning provided by the lateral springs and relieves the central link and the plate from severe strains which would otherwise occur.

To prevent the king pin from pulling out of the tractor plate the casting is provided with a flange 34 which engages a corresponding groove in the king pin, and a locking member 35, actuated by a series of links and levers, diagrammatically shown, and a handle 36 attached to the wheel. Any number of various locking means may be employed, such as are commonly known to those skilled in the art to which this invention appertains.

To support the ends 37 of the extensions when tilted downward prior to coupling and during the early part of the coupling operations, a cross bar 38 is attached to the tractor frame 16. Inverted U shaped brackets 39, mounted on the cross bar, act as seats for the tips 37 of the extensions 2.

Under normal conditions the load is taken by the two outer bearings, no work being done by the center supporting link. In case of upward loads, however, or in the event the king pin misses the V-guide and bumps down on the upper plate of the fifth wheel during coupling operations, the center link comes into play and transmits forces directly into the cross member without stressing the upper plate. For this reason the central portion of the upper plate 1 between the outer ring need not be of heavy construction. A U shaped member 40 is welded to the plate and extends from a flat portion of the casting 26 to the inner side web of the channel 6 to act as a stiffener and suffices for the necessary strength required of this section.

By using the center tie furnished by the link it is unnecessary to make the outer bearings full bearings, making it possible to utilize pressed steel and eliminating expensive maching operations. These outer bearings, although not held down by any attachment, are pressed down by the upper plate on the trailer, which acts with the king pin as a rivet attached to the cross member. This maintains the downward load on the outer bearings and prevents them from moving up in relation to the cross member, thus providing the desired broad surface area of contact.

The invention having been described what is claimed is:

1. The combination with a tractor-trailer connection embodying a fifth wheel, of a tractor plate pivotally mounted on horizontally aligned half round supports attached to a cross member on the tractor at points beneath the outer periphery of the plate, said tractor plate being pinned to said cross member by a central substantially vertical connecting link in alignment with said support.

2. The combination with a tractor-trailer connection embodying a fifth wheel, of a tractor plate resting on half round supports, about which the plate may rotate, said supports being slidable in a forward and backward direction on the tractor, and a central connecting link between a cross member on the tractor and the plate disposed to transmit corresponding motion.

3. A fifth wheel for tractor-trailer combinations, comprising a sheet metal tractor plate pivotally supported on two laterally disposed bearings, means for receiving a king pin at the center of said plate, and means at the center of said plate for holding the same against upward movement from said king pin.

4. A fifth wheel for tractor-trailer combinations, comprising a sheet metal plate pivotally mounted on laterally disposed aligned bearings, means for receiving a king pin at the center of said plate, and means for holding the central portion of said plate against vertical movement from said king pin without retarding the pivotal movement of the plate.

5. A fifth wheel for tractor-trailer combinations, comprising a sheet metal plate pivotally mounted on laterally disposed aligned bearings, means for receiving a king pin at the center of said plate, and pivotal means in alignment with said bearings for holding the central portion of said plate against vertical movement from said king pin without retarding the pivotal movement of the plate.

6. A sheet metal fifth wheel member comprising a substantially circular plate having a raised rim portion formed therein and a channel shaped strengthening member disposed beneath said rim portion and secured thereto around the circumference of the plate with the web of the channel engaging said raised portion for substantially the entire width of the latter and with the flanges of the channel extending downwardly therefrom, said plate having a central opening and a lateral slot extending therefrom to the rim for receiving a king pin.

7. A sheet metal fifth wheel member comprising a substantially circular plate having a central opening and a lateral slot extending therefrom to the rim for receiving a king pin, means secured to said plate for strengthening the rim portion thereof, and means for strengthening the portions adjacent said slot, said first named means comprising a channel shaped member having a horizontal web and downwardly directed flanges with the outer flange being secured to a downwardly extending circumferential flange on said plate.

8. A sheet metal fifth wheel member comprising a substantially circular plate having a central opening and a lateral slot extending therefrom to the rim for receiving a king pin, a pair of inclined extensions continuing said slot for guiding the king pin to position, and an inverted channel shaped member secured to the underside of each extension to provide a box cross section therefor.

9. A sheet metal fifth wheel member comprising a substantially circular plate, a channel member secured to the underside thereof about the circumference of the plate, and supporting bearings disposed in alignment on opposite sides of said plate and in said channel member.

10. In a bearing support for fifth wheel mountings, a transverse channel member secured on a frame, a larger superimposed channel member extending over the top thereof with its horizontal web resting upon the horizontal web of the first named channel member, and spring means for limiting relative horizontal movement between said channel members.

DONALD W. SHERMAN.